(12) United States Patent
Nierescher

(10) Patent No.: US 7,576,513 B1
(45) Date of Patent: Aug. 18, 2009

(54) BATTERY CHARGER CONFIGURATION REDUCING THERMAL CONDUCTION

(76) Inventor: David S. Nierescher, 18628 SE. 144Th St., Renton, WA (US) 98059

(*) Notice: Subject to any disclaimer, the term of this patent is extended or adjusted under 35 U.S.C. 154(b) by 339 days.

(21) Appl. No.: 11/649,057

(22) Filed: Jan. 3, 2007

Related U.S. Application Data

(60) Provisional application No. 60/795,007, filed on Apr. 26, 2006.

(51) Int. Cl.
*H01M 10/46* (2006.01)
(52) U.S. Cl. .................................................. 320/107
(58) Field of Classification Search .............. 320/107, 320/109, 106, 110, 114, 115, 116, 150

See application file for complete search history.

(56) References Cited

U.S. PATENT DOCUMENTS

| | | | |
|---|---|---|---|
| 2002/0079866 A1* | 6/2002 | Odaohhara | 320/150 |
| 2003/0102847 A1* | 6/2003 | Aldridge et al. | 322/7 |
| 2003/0117109 A1* | 6/2003 | Trepka | 320/126 |
| 2004/0232891 A1* | 11/2004 | Kimoto et al. | 320/150 |
| 2005/0046387 A1* | 3/2005 | Aker et al. | 320/125 |
| 2006/0028183 A1* | 2/2006 | Izawa et al. | 320/150 |

* cited by examiner

*Primary Examiner*—Edward Tso
(74) *Attorney, Agent, or Firm*—NW Patent Group; James L Davison

(57) ABSTRACT

A method and apparatus for separating a housing containing circuit charging components from a housing containing battery charging contacts and a rechargeable battery for the purpose of minimizing heat transfer from the components of the battery charging circuit to the rechargeable battery. This is accomplished by utilizing a thermally resistant bridge between the charging circuit components generating heat and the battery(s) under charge.

11 Claims, 3 Drawing Sheets

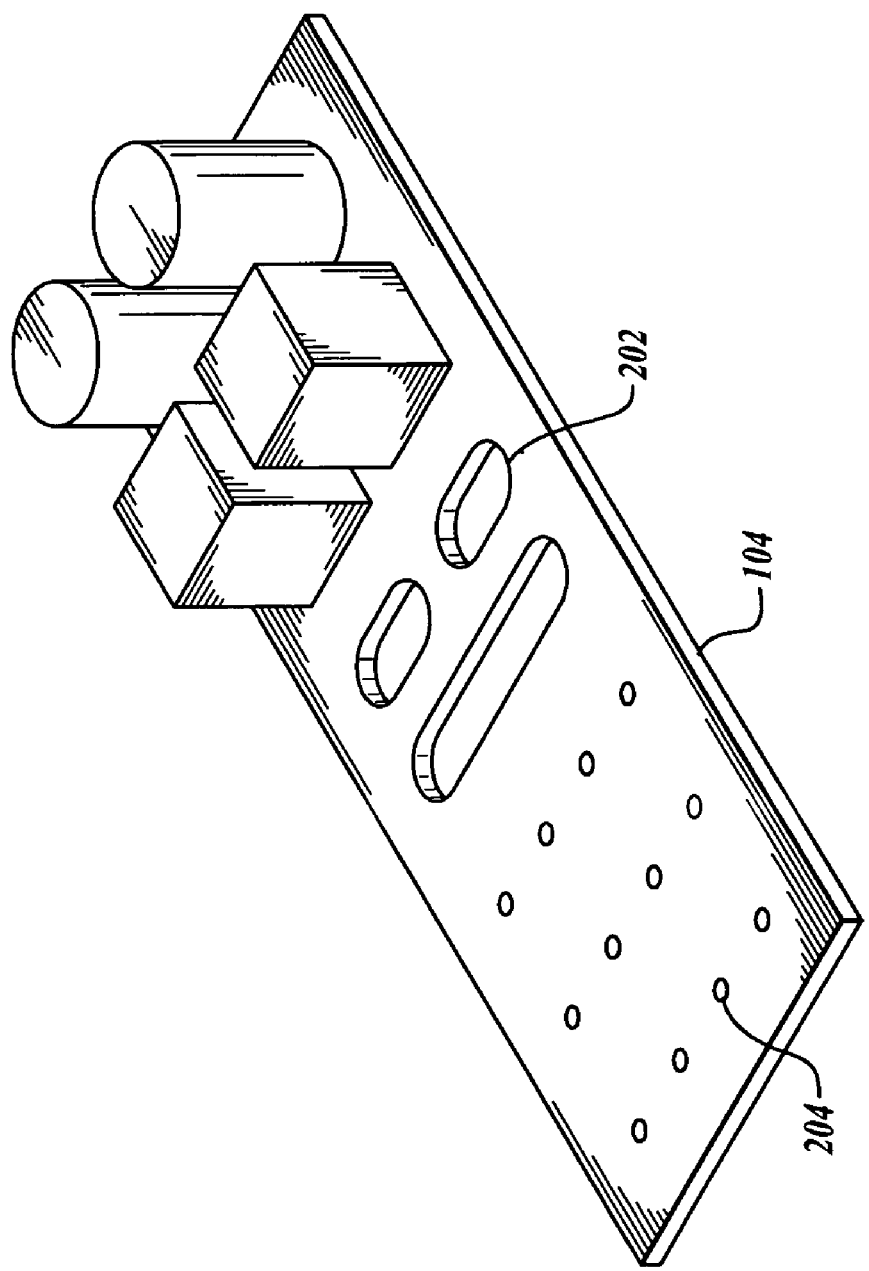

BATTERY CHARGER CONFIGURATION REDUCING THERMAL CONDUCTION

CROSS-REFERENCE TO RELATED APPLICATIONS

This application claims the benefit of provisional patent application Ser. No. 60/795,007 filed Apr. 26, 2006 by the present inventor.

BACKGROUND

1. Field

The present invention relates to the thermal management of a battery charging system. Controlling the heat flow from the circuit that converts analog power to a digital charging pulse to the battery under charge is necessary to ensure a fast and complete charge without any degradation of that battery. Lithium ion batteries are particularly susceptible to the influences of temperature while under charge and are typically required to have their charging suspended when the battery temperature reaches 45° Celsius.

2. Description of Related Art

There have been previous attempts to control the heat transferred from the charging circuit to the batteries under charge. Some designs have ignored the problem of the heat from charging circuit components reaching the battery(s) under charge and have modified their battery charging parameters to keep the lithium-ion battery temperatures within the recommended limits. In the past voltages and charging cycles are adjusted when the temperature of the battery under charge had reached certain limits. This, however, increased the time required to charge the battery, added cost, complexity and another potential failure point of the charging unit. Other approaches included adding cooling fins to the unit to transfer the heat generated by the charging circuit. However this added weight and size to the battery charger and the amount of heat carried away is largely dependent on the ambient temperature and the amount of air flow circulating around the fin. Another approach included adding fans to transfer the heat generated by the charging circuit away from the battery. Fans also add complexity, and another heat load.

OBJECTS AND ADVANTAGES

Accordingly several objects and advantages of the present invention are: simplicity, less cost, higher charging efficiency and reduced charging time. Simplicity because there are no moving parts, such as a fans and the circuitry to power the fans, to wear out or otherwise fail. Also less cost, weight and size because there is an absence of high conductivity (usually metal) cooling fins that need to be fabricated and installed. Higher charging efficiency because of only small amounts of heat are transferred from the charging circuit components to the battery(s) under charge thereby eliminating any waiting period during charging to let the battery(s) under charge to cool down. For the same reason the present invention reduces charging time because the battery(s) under charge don't reach their reduced charging parameter temperature limits. Although this design approach is of particular benefit to recharging Lithium-ion batteries, it is also beneficial to all types of rechargeable batteries because the heat from the charging circuit components is thermally isolated from the batteries themselves. In this manner no extraneous heat is added to the battery(s) under charge except for the potential of the battery(s) for self-heating themselves.

SUMMARY

In accordance with the present invention a battery charger is presented that is configured to reduce an amount of heat, generated by components of a charging circuit, that reaches the station where the batteries are inserted for recharging. The charging circuit housing containing the components of said charging circuit uses a thermal isolating bridge to separate the charging circuit housing from the battery(s) under charge. The thermal isolating bridge, in one implementation, contains a circuit board embedded with electronic traces. The traces carry the charging signal from the charging circuit housing to the battery terminal charger contacts. The thermal isolating bridge is configured to minimize heat transfer from the charger circuit housing to the battery(s) under charge by the use of a thin walled structure of low conductivity material covering the circuit board containing the charging signal. Inside the structure the circuit board is surrounded by a volume of non-moving low conductivity air. To reduce the heat transfer further, there are air vents incorporated into the charger circuit housing to facilitate convective heat flow through and around components making up the charger circuit.

The circuit board carrying the charging signal also incorporates cutouts removing unnecessary circuit board material further reducing a possible path of conductive heat transfer.

BRIEF DESCRIPTION OF THE DRAWINGS

The invention is further described in connection with the accompanying drawings, in which:

FIG. 2 illustrates the appearance of the circuit board with thermal resistance cutouts.

DETAILED DESCRIPTION OF THE PREFERRED EMBODIMENT

What is described herein is a method and apparatus for utilizing a thermally resistant bridge between the charging circuit components generating heat and the battery(s) under charge. It will be appreciated that batteries, specifically Lithium Ion batteries, but in general all rechargeable batteries, can be charged faster and more safely if they are isolated from other heat sources.

The present invention incorporates several unique design aspects that increases the thermal resistance of the battery charging structure resulting in helping isolate the battery(s) under charge from the heat generated by the charging circuit components.

Figure 1A:
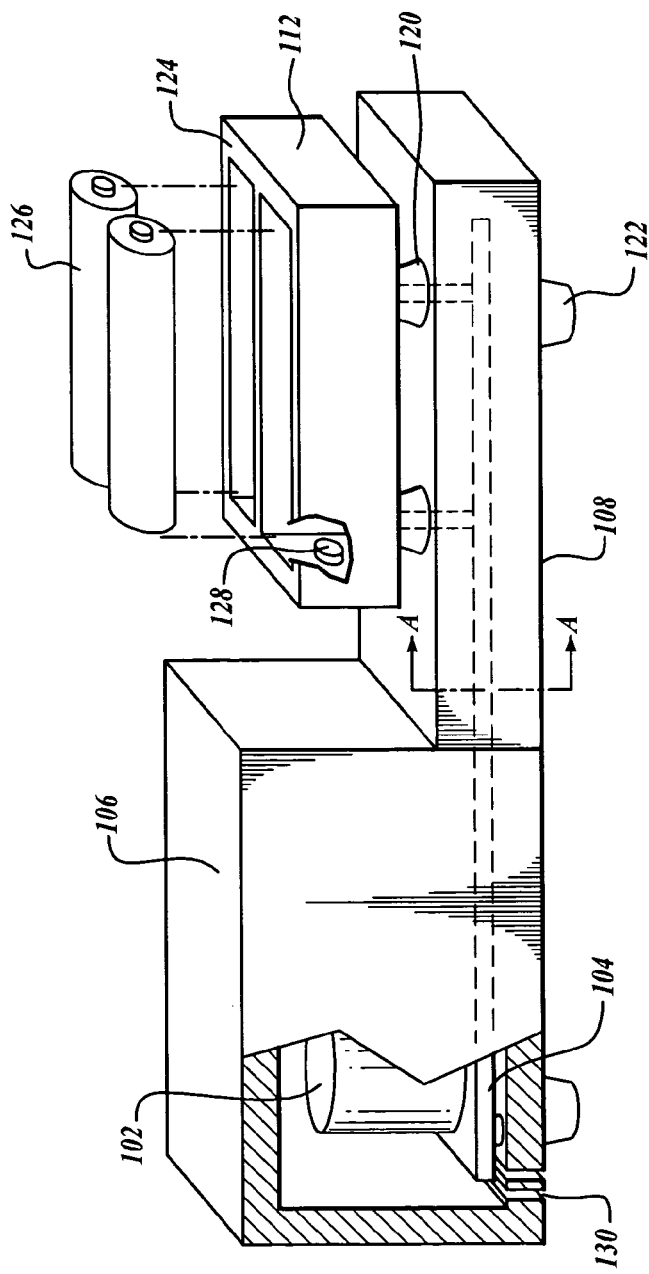
FIG. 1A illustrates the battery charger.
Figure 1B:
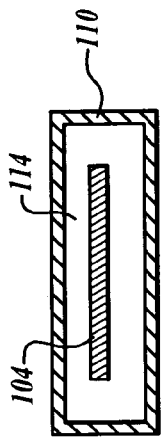
FIG. 1B shows a cross section A-A of the battery charger bridge.

Although FIGS. 1A and 1B represents one embodiment of the present invention, it is readily appreciated that one-skilled in the art given this disclosure could produce multiple other embodiments using this invention. For example there could be multiple battery charging contact arms emanating in a circular array from a central core of charging circuit components. It is also possible to use a rectangular charger housing, containing the charger circuitry, with bridges extending from two or more sides of the housing. The specific details as shown in the one embodiment is meant to provide a more thorough understanding of the present invention, not to preclude other methods to practice the invention.

As seen in FIG. 1A the charger housing containing the charging contacts and battery 112 is isolated from the housing 106 containing the charging circuit components 102 by a bridge 108. FIG. 1B shows a cross section of the bridge. The amount of heat transferred from the charging circuit components to the battery(s) under charge is a function of many different parameters. The three methods that heat can be transferred from one place to another are via conduction, convection and radiation. To reduce the amount of conducted heat, generated by the charging circuit components that reach the battery(s) under charge, the present invention uses a thin walled housing fabricated from plastic. General heat transfer theory tells us that the amount of heat conducted through a body is a direct function of the thermal conductivity (k) of the body's material and the cross sectional area (A) of the body through which the heat must pass. The amount of heat generated (BTUs) per unit time (hr) by the charging circuit components must be equal to the total heat lost by the charger unit for the temperatures of the charging circuit components, charger housing and battery(s) to reach an equilibrium.

The conversion efficiency of any charger and therefore the number of BTUs/hr generated depends on the charge state of the batteries being charged. For example on a typical charging cycle, when the batteries are consuming max power (during the later stages of constant current charge mode), conversion efficiency is about 87%. However, when the batteries are just starting charge or just finishing charge, the charge current is very low, the batteries are consuming low power, and the conversion efficiency is quite low due to the quiescent power of the charger being more dominate.

If it's at max power, the following holds

Power into the batteries=4.2V*1.3 A=5.5 W*4 bays=21.8 W

Power into the charger=21.8*1.13=24.6 W

Power dissipated in the charger is 24.6−21.8=2.8 W=9.56 BTU/hr

This is peak rather than average power and the entire charge cycle typically extends over 3 hours. Because the charge current and battery voltage varies over this cycle, the power dissipated in the charger varies as well.

Reducing the cross sectional area of the charger bridge material 110 and using a low thermal conductivity material such as plastic increases the thermal resistance of the conduction path from the charging circuit components to the battery(s) under charge. This is a major factor in permitting only a small amount of heat to reach the battery(s) under charge while allowing other heat transfer mechanisms to dissipate the heat generated by the charging circuit components.

Similarly the battery housing standoffs 120 shown in FIG. 1 also serve to isolate whatever heat has migrated through the bridge and circuit board from the battery(s) under charge.

Another heat transfer limiting mechanism employed by the bridge is the volume of air 114 in the bridge surrounding the board carrying the traces to the battery charging contacts. Non-moving air is an excellent heat insulator with a very low conductivity factor. Besides air, alternative insulation means may be implemented such as filling the bridge cavity with foam insulation or other low heat conducting material. Also notice the entire battery charger housing rests on surface standoffs 122 giving another method of heat dissipation of the charging circuit components by allowing air circulation around the housing.

Other mechanisms for transferring heat are convection and radiation. The heat radiation generated by the charger component housing is simply a function of the temperature of the body doing the emitting. The higher the temperature the more heat radiated. Given the relatively large surface area of the component charger circuit housing compared to the surface area of the bridge, containing the circuit traces to the charger contacts 128, it should be expected that the component charging circuit housing would be the major contributor to the radiation heat emission.

A third mechanism, as mentioned, of transferring heat from the component charging circuit is by natural convection. This mechanism uses moving air that, when heated, rises, and is therefore replaced by cooler air drawn into the vacuum left by the cooler air rising whereupon the cycle is repeated. The natural convection process is made even more efficient in the present invention by implementing strategically placed vents 130 in the component charging system housing that help circulate the air around the heat generating components.

To also assist in the reduction of heat transferred from the components of the charging circuit through the bridge to the battery(s) under charge, the present invention also removes material 202, as shown in FIG. 2, from the circuit board 104, containing the charger signal carrying traces. The traces lead from the components of the charging circuit to the battery contacts 128. Wires may also be used in place of traces. The thermal conductivity of the circuit board material is very low and the reduced cross section (therefore reduced area) of the board as a result of the cut-outs 202 increases the boards thermal resistance thereby again reducing the amount of heat that can be transferred from the components of the charging circuit to the battery(s) under charge via the board.

Figure 3:
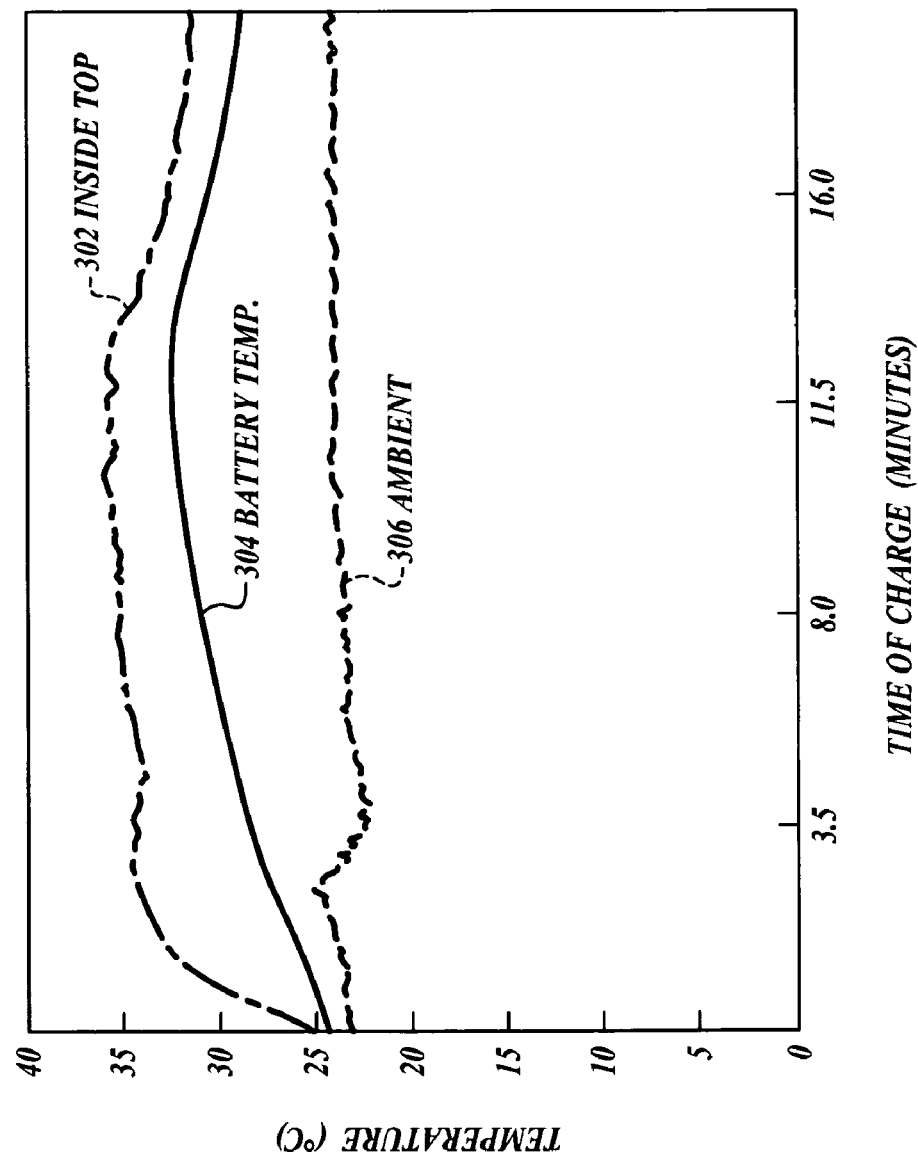
FIG. 3 shows a chart of temperature vs. time of the charger circuit housing, battery under charge and ambient air.

As actual results show in FIG. 3 the temperature of the battery under charge 304, using this design, peaks at a temperature 4° C. (7.2° F.) lower than the inside of the top of the charging circuit's components housing 302. it should be noted that as the ambient temperature 306 of the air surrounding the charging unit increases, such as in a warehouse situation in the summer, that temperature difference may make the difference between a fast, efficient charge and a slower, and therefore less heat generating, charge capability.

Therefore, although the invention has been described as setting forth specific embodiments thereof, the invention is not limited thereto. Changes in the details may be made within the spirit and the scope of the invention, said spirit and scope to be construed broadly and not to be limited except by the character of the claims appended hereto.

I claim:

1. A battery charger, for charging at least one rechargeable battery, configured to reduce heat generated by a charging circuit from reaching said at least one rechargeable battery comprising:
   a) a charging circuit housing containing components of said charging circuit;
   b) at least one bridge separating the charging circuit housing from a battery charging station, said battery charging station containing at least one set of battery terminal charging contacts;
   c) said at least one bridge containing conductive means, said conductive means used to carry a charging signal from the charging circuit to said at least one set of battery terminal charging contacts; and
   d) said at least one bridge configured to reduce heat transfer from the charger circuit housing to the battery charging station.

2. The at least one bridge of claim 1 wherein the configuration to reduce heat transfer from the charging circuit housing to the battery charging station comprises:
   a) a thin walled construction of low conductivity material; and b) a static air space surrounding said conductive means used to carry the charging signal.

3. The battery charger of claim 1 further including air vents, incorporated into the charging circuit housing to facilitate convective heat flow through and around the components of the charging circuit.

4. The battery charger of claim 1 further including surface stand-offs to aid in said convective heat flow.

5. The battery charger of claim 1 wherein said conductive means used to carry the charging signal is a circuit board containing at least one conductive trace.

6. The battery charger of claim 5 further including at least one cutout removing unnecessary circuit board material thereby further reducing a possible path of conductive heat transfer.

7. The battery charger of claim 1 wherein said conductive means used to carry the charging signal is at least one wire connecting the charging circuit to the battery terminal charging contacts.

8. The battery charger of claim 2 further including filling the static air space surrounding the conductive means with a low conductivity material.

9. The battery charger of claim 8 wherein the low conductivity material is foam.

10. The battery charger of claim 1 comprising multiple bridges, separating the charging circuit housing from multiple battery charging stations, said multiple battery charging stations radiating out in a circle from the charging circuit housing.

11. The battery charger of claim 1 comprising multiple bridges, separating the charging circuit housing from multiple battery charging stations, said multiple battery charging stations linearly arrayed out from the charging circuit housings.

* * * * *